UNITED STATES PATENT OFFICE.

ANDERS M. STRUSHOLM, OF PERTH AMBOY, NEW JERSEY.

PROCESS OF MAKING ENAMELED BRICK, TILES, &c.

SPECIFICATION forming part of Letters Patent No. 520,868, dated June 5, 1894.

Application filed March 3, 1893. Serial No. 464,569. (No specimens.)

*To all whom it may concern:*

Be it known that I, ANDERS M. STRUSHOLM, a citizen of the United States, residing at Perth Amboy, in the county of Middlesex and State of New Jersey, have invented a certain new, useful, and valuable Improvement in Processes of Making Enameled Brick, Tiles, &c., of which the following is a full, clear, and exact description.

This invention relates to enameled bricks, and process of making the same.

The object of the invention is to provide an enameled brick or the like having the appearance, when completed, of granite, marble, or any other suitable stone.

The invention consists in an enameled brick, and in the process of making the same, as will be hereinafter fully described and claimed.

In carrying my invention into effect I first mold the brick or tile in the usual way, but preferably by the dry pressed process described in patent granted to me, No. 451,536.

In the procedure, I employ a clay composed of about equal parts of alumina and silica. With this clay I mix the coloring matter, preferably the metallic oxides of say copper, iron, cobalt, or the like. These are mixed with the clay in water in the proportions requisite to produce the desired shade of color. For example I mix say one pound of clay with the requisite quantity of each kind of metallic oxide separately for each color desired, such as blue, green, black, or red, and for white I employ kaoline, or china clay. After the mixtures are dried, they are pulverized and passed through a coarse sieve. I frequently granulate the clay by passing it between rollers or by other means too well known to clay workers to warrant a description of the same. The object of pulverizing the mixture is to make a homogeneous mass and also to adapt the same to mingle or mix readily with the other ingredients employed in carrying out my improved process. I then mix the coarse powder together in different proportions with the clay which is to form the brick-body for the colors desired. The powdered clay is next moistened by steam, or by a damp floor in the ordinary way and is introduced into a suitable mold and subjected to pressure and is finally burned in the usual way.

After the bricks are burned I place them on a horizontal grinding wheel, such as used by marble workers, for the purpose of grinding off a portion of the surfaces or faces to expose the different colored grains. The brick is then dipped into a suitable transparent enameling preparation and fired to a potter's heat. This second burning serves to set the enamel and give a polish to the surfaces of the brick. When cool, they are a true imitation of polished granite or other stone which I may desire to imitate.

It is to be understood, that instead of grinding the brick as I have described the powdered transparent glaze may be applied in the mold in the same manner as that set forth in the process in the patent referred to, and thus produce the enameled brick with but one burning.

Instead of mixing the coloring matter with the clay, so that the brick presents the same appearance throughout its entirety, I may face the brick with the granulated coloring material and then glaze.

Having thus fully described my invention, what I claim as new, and desire to secure by Letters Patent, is—

1. The herein described process of preparing enameled brick which consists in grinding the surface of a previously burned brick to expose the colors therein, then enameling said surfaces, and finally reburning the brick, substantially as and for the purpose described.

2. The herein described process of making enameled brick which consists first in mixing a suitable metallic oxide with the clay, and molding, drying, and then pulverizing the mixture, then remolding the pulverized clay, and burning the brick, then grinding down the surfaces of the brick, and finally enameling the surfaces thereof, substantially as described.

In testimony whereof I affix my signature in presence of two witnesses.

ANDERS M. STRUSHOLM.

Witnesses:
E. M. KELLY,
JAMES E. McALINDER.